Aug. 2, 1949.   R. J. VEDOVELL   2,478,067
SEAL
Filed July 10, 1947
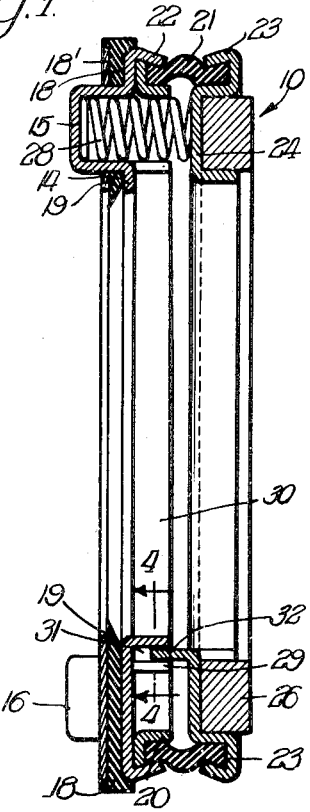
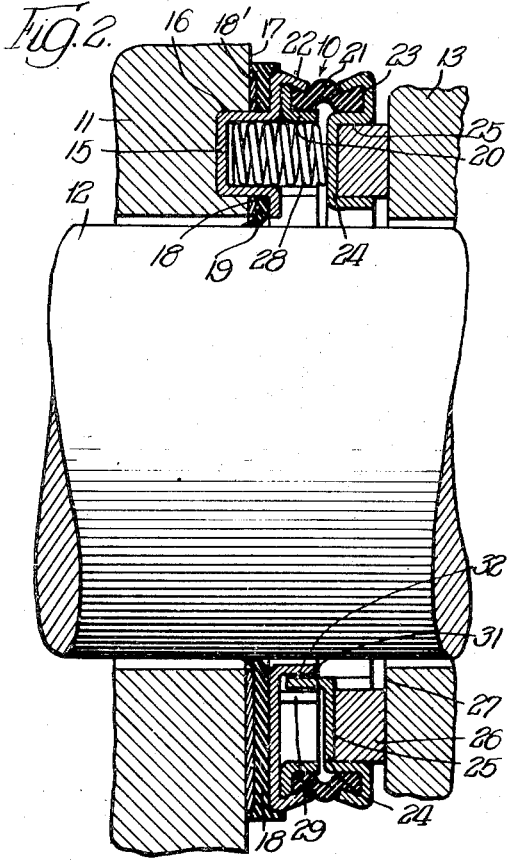
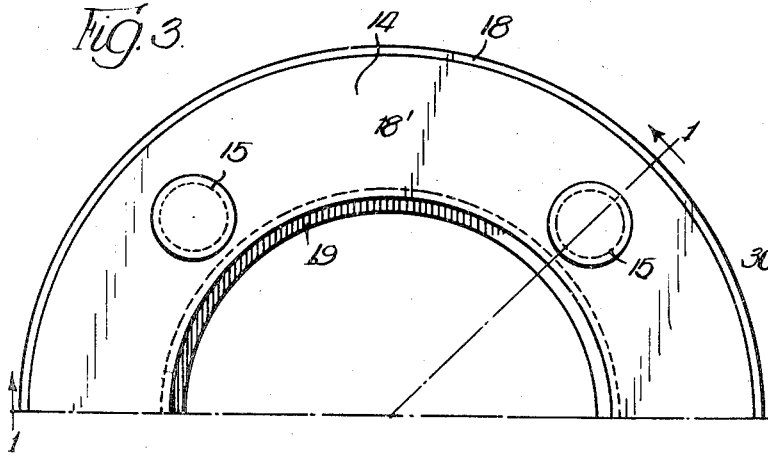
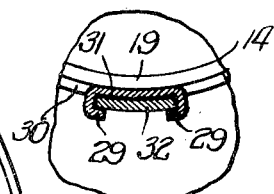
INVENTOR.
Rudolph J. Vedovell,
BY
Cromwell, Greist + Warden
Attys Patented Aug. 2, 1949

2,478,067

UNITED STATES PATENT OFFICE 2,478,067

SEAL

Rudolph J. Vedovell, Kenilworth, Ill., assignor to Chicago Rawhide Manufacturing Company, Chicago, Ill., a corporation of Illinois Application July 10, 1947, Serial No. 760,055

6 Claims. (Cl. 286—11)

This invention pertains to improvements in a diaphragm type seal adapted for coaction with a pair of relatively rotatable parts in preventing entry of dust or fluid leakage therebetween.

It is an object of the invention to provide a self-contained seal assembly including a pair of coacting annular members, one of which carries means adapted for relatively rotative sealing engagement with a sealing surface and the other of which constitutes a mounting and driving member for the assembly, in combination with an axial, sleeve-like diaphragm secured to and extending between the members to exclude dirt and foreign matter, in which combination said mounting member serves the dual purpose of securing the assembly to one of the aforesaid relatively rotatable parts and of housing certain internal expanding means for the assembly.

Another object is to provide a comparatively inexpensive seal of the type described having novel and simplified means for keying or locking the component members thereof against relative rotation, while permitting ready axial shifting of one thereof in operation.

Other objects and advantages will appear in the specification and claims to follow. While but a single form of the invention has been shown for purpose of illustration, those skilled in the art will readily perceive various possible modifications and alterations thereof, all well within the scope of the appended claims.

In the drawings,

Fig. 1 is a view in transverse radial section through the seal of the present invention, illustrating the same in the relaxed, expanded condition thereof prior to installation, viewed on line 1—1 of Fig. 3;

Fig. 2 is a view in section generally similar to Fig. 1, showing the parts of the seal as operably compressed and installed in association with a pair of relatively rotatable parts;

Fig. 3 is a fragmentary end view of the seal, viewed from the left of Fig. 1; and Fig. 4 is a fragmentary view in section on a line corresponding to line 4—4 in Fig. 1.

This invention relates to a seal which is employed for the purpose of sealing certain rotating parts against entry of dust and fluid leakage; and more particularly the invention resides in certain specific details contributing to a very inexpensive production indeed. In Fig. 1, I have illustrated the seal, generally designated 10, in a relaxed, expanded position, and in Fig. 2 as applied to a housing 11 or the like for coaction with a shaft 12 which may be rotatable relative to the housing. The seal also coacts with a further member 13 to produce a running face seal thereagainst in a manner to be described.

Seal 10 comprises a radially disposed, annular mounting and driving ring 14 of sheet metal construction which is shaped to provide one or more hollow, axially and rearwardly extending, cup like, driving lugs 15 adapted to be received in driving sockets 16 in housing 11, or a comparable part, to secure the seal against relative rotation thereon.

A radial shaft sealing washer 18 is interposed between the forward housing surface 17 and the rear surface of mounting ring 14, being provided with appropriate apertures receiving the lugs 15 in the manner illustrated: and in its operative position the washer, along with an intervening apertured clamping or pressure plate 18' is tightly clamped between ring 14 and the housing. The inner peripheral margin of the washer is provided with a feathered edge 19 for rotative radial sealing action on the surface of shaft 12.

The forward surface of ring 14 is abutted by an annular sheet metal diaphragm clamping element 20 of L-shaped section, disposed concentrically with the mounting ring and adapted to receive the adjacent lateral edge of the flexible axially extending, sleeve like diaphragm 21. To secure the diaphragm edge in place the outer periphery 22 of ring 14 is spun or otherwise deformed forwardly and downwardly over the radial flange of element 20 into engagement with the diaphragm, thereby clamping the same against the axial flange of said element.

The opposite margin of the diaphragm 20 is tightly clamped in a rearwardly opening, annular, deformable channel 23 in the forward sealing ring 24 of the assembly, whereby the latter is well sealed by the diaphragm against radial entry of dirt or foreign matter. Radially inwardly of channel 23 the ring 24 is provided with an annular, forwardly opening groove 25 fixedly receiving a sealing nose which may be fabricated of leather, a suitable sealing composition, carbon or the like, said nose having running face sealing engagement with an adjacent surface 27 of the member 13.

In order to exert sealing thrust on ring 24 and nose 26 the coil compression springs 28 are interposed between rings 14 and 24, being received and supported in the interior of the cup like lugs 15. As shown, they forwardly abut ring 24 immediately to the rear of sealing nose 26, hence a uniform and directly transmitted axial thrust on the nose is attained.

In order to prevent relative rotation of rings 14 and 24, the former, adjacent its inner periphery, has pairs of circumferentially oppositely directed tabs slitted from flange 30 of the ring which are bent outwardly and then toward one another, so as to define an elongated driving slot 31 receiving the coacting rearwardly projecting driving tongue 32. Tongue 32 is slitted and struck rearwardly from the material of ring 24, i. e., from the inner wall of the nose receiving groove 25 in the latter. Accordingly, though axial compressing movement of the parts is permitted, the tongue 32 sliding in slot 31 for this purpose, the ring members 14, 24 are positively keyed against relative rotation.

The foregoing seal is extremely simple and inexpensive in nature, being fabricated in the main from sheet metal stampings which are assembled with a minimum of difficulty. Sealing action takes place at three locations, i. e., against shaft 12 in the radial direction by reason of the feathered sealing lip 19; against member 13 by the running seal of nose 26; on surface 27 and between the rings 14, 24, by reason of the flexible, sleeve-like diaphragm 21, which prevents entry of dust or dirt to the springs 28 and other parts sealed as aforesaid while permitting free axial shifting of the rings against the thrust of the springs.

I claim:

1. A seal of the type described, comprising a pair of coacting annular, concentric rings, at least one of which is fabricated of sheet metal and has angularly spaced, hollow, axially extending external lugs thereon which are rearwardly engageable in a relatively fixed surface to mount the seal fixedly thereon, the other of said rings being provided with an annular sealing nose, axially yieldable means to prevent radial leakage between said rings, and a plurality of coil compression springs disposed between said rings and received at one end thereof in said hollow lugs.

2. A seal of the type described, comprising a pair of coacting annular, concentric rings, at least one of which is fabricated of sheet metal and has angularly spaced, hollow, axially extending external lugs thereon which are rearwardly engageable in a relatively fixed surface to mount the seal fixedly thereon, a flexible annular sealing member apertured to receive said lugs and adapted to be compressed between said ring and surface in the installed condition of the seal, the other of said rings being provided with an annular sealing nose, axially yieldable means to prevent radial leakage between said rings, and a plurality of coil compression springs disposed between said rings and received at one end thereof in said hollow lugs.

3. A seal of the type described, comprising a pair of coacting annular, concentric rings, at least one of which is fabricated of sheet metal and has angularly spaced, hollow, axially extending external lugs thereon which are rearwardly engageable in a relatively fixed surface to mount the seal fixedly thereon, a flexible annular sealing member apertured to receive said lugs and adapted to be compressed between said ring and surface in the installed condition of the seal, said member having a radially projecting sealing lip, the other of said rings being provided with an annular sealing nose, axially yieldable means to prevent radial leakage between said rings, and a plurality of coil compression springs disposed between said rings and received at one end thereof in said hollow lugs.

4. A seal of the type described, comprising a pair of coacting annular, concentric rings, at least one of which is fabricated of sheet metal and has angularly spaced, hollow, axially extending external lugs thereon which are rearwardly engageable in a relatively fixed surface to mount the seal fixedly thereon, the other of said rings being provided with an annular sealing nose, a flexible sleeve-like member secured at its opposite ends to said rings and yieldable upon relative axial movement of the latter, and a plurality of coil compression springs disposed between said rings and received at one end thereof in said hollow lugs.

5. A seal of the type described, comprising coacting annular concentric rings, at least one of which is fabricated of sheet metal and has hollow, angularly spaced and axially extending external lugs thereon which are rearwardly engageable with a support to mount the seal fixedly thereon, the other of said members being provided with an annular sealing nose, axially yieldable means to prevent radial leakage between said rings, and compression springs disposed to abut said rings, one end of said springs being received in said hollow lugs, said rings having coacting, axially telescoped elements thereon to key the rings against relative rotation.

6. A seal of the type described, comprising an annular sheet metal ring having angularly spaced, hollow, axially extending lugs between the peripheral margins thereof which are rearwardly engageable in a supporting surface to mount the seal fixedly thereon, one of the peripheral margins of said ring being shaped to define a driving element, a further annular ring provided with an annular, forwardly opening groove receiving an annular sealing nose, a margin of said last named ring being shaped to define a driving element adapted to engage and drivingly coact with the first element, axially yieldable means to prevent radial leakage between said rings, and a plurality of coil compression springs disposed between said plates and located at one end thereof in said lugs, said springs abutting and urging said rings in opposite axial directions.

RUDOLPH J. VEDOVELL.

REFERENCES CITED

The following references are of record in the file of this patent:

UNITED STATES PATENTS

| Number | Name | Date |
|---|---|---|
| 2,277,771 | McNab | Mar. 31, 1942 |
| 2,301,723 | Vedovell | Nov. 10, 1942 |
| 2,372,781 | Hobbs | Apr. 3, 1945 |